(12) United States Patent
Pointon et al.

(10) Patent No.: US 9,542,235 B2
(45) Date of Patent: Jan. 10, 2017

(54) PROCESS-SAFE READ/WRITE LOCKS

(75) Inventors: Richard Pointon, Stoke-on-Trent (GB); Richard James Somerfield, Thelwall (GB)

(73) Assignee: AppSense, Limited (GB)

( * ) Notice: Subject to any disclaimer, the term of this patent is extended or adjusted under 35 U.S.C. 154(b) by 1292 days.

(21) Appl. No.: 12/967,430

(22) Filed: Dec. 14, 2010

(65) Prior Publication Data

US 2012/0151110 A1 Jun. 14, 2012

(51) Int. Cl.
*G06F 9/52* (2006.01)

(52) U.S. Cl.
CPC .................... *G06F 9/526* (2013.01)

(58) Field of Classification Search
CPC ......... G06F 9/52; G06F 9/4843; G06F 9/5016
See application file for complete search history.

(56) References Cited

U.S. PATENT DOCUMENTS

| | | | |
|---|---|---|---|
| 5,872,981 A | 2/1999 | Waddington et al. | |
| 6,029,190 A | 2/2000 | Oliver | |
| 6,041,384 A | 3/2000 | Waddington et al. | |
| 6,546,443 B1 | 4/2003 | Kakivaya et al. | |
| 6,725,308 B2 | 4/2004 | Joy et al. | |
| 7,099,866 B1* | 8/2006 | Crosbie et al. | |
| 7,340,569 B2 | 3/2008 | Goodman et al. | |
| 7,594,234 B1 | 9/2009 | Dice | |
| 7,657,891 B2 | 2/2010 | Jensen et al. | |
| 7,664,936 B2 | 2/2010 | Jensen et al. | |
| 8,266,607 B2* | 9/2012 | Burka et al. | 717/154 |
| 2007/0094431 A1 | 4/2007 | Fachan | |
| 2008/0320262 A1 | 12/2008 | McKenney et al. | |
| 2009/0064094 A1* | 3/2009 | Burka et al. | 717/106 |
| 2010/0114849 A1 | 5/2010 | Kingsbury et al. | |
| 2010/0174875 A1* | 7/2010 | Dice et al. | 711/152 |
| 2010/0275209 A1 | 10/2010 | Detlefs | |
| 2012/0151110 A1* | 6/2012 | Pointon et al. | 710/200 |

(Continued)

OTHER PUBLICATIONS

"An Introduction to Programming With Threads", Georgia Institute of Technology College of Computing, retrieved from www.cc.gatech.edu/classes/AY2010/cs4210_fall/lectures/03-BirrellThreads.pdf, Aug 29, 2003.*

(Continued)

*Primary Examiner* — Lewis A Bullock, Jr.
*Assistant Examiner* — Kevin X Lu
(74) *Attorney, Agent, or Firm* — Cooley LLP

(57) ABSTRACT

In one embodiment, a non-transitory processor-readable medium stores code representing instructions that when executed cause a processor to obtain a first mutual exclusion object. The first mutual exclusion object can be a write mutual exclusion object associated with a shared resource. The code can further represent instructions that when executed cause the processor to obtain a second mutual exclusion object associated with an object manager module and define a read event object with a name conforming to a predetermined format. The code can further represent instructions that when executed cause the processor to release the second mutual exclusion object, release the first mutual exclusion object, read at least a portion of the shared resource, obtain the second mutual exclusion object, destroy the read event object and release the second mutual exclusion object.

15 Claims, 5 Drawing Sheets

(56) References Cited

U.S. PATENT DOCUMENTS

2013/0290583 A1* 10/2013 Dice et al. .................. 710/200
2013/0290967 A1* 10/2013 Calciu et al. ................ 718/102

OTHER PUBLICATIONS

"GMU-Modern Multithreading Lecture Notes—Chapter 3 Notes", retreved from www.cs.gmu.edu/~rcarver/ModernMultithreading/LectureNotes/Chapter3Notes.pdf, Mar. 5, 2006.*
Herlihy et al. "The Art of Multiprocessor Programming"—(Chapter 8.3.2), 2008.*
Corbet et al., "Linux Device Driver, 3rd Edition"—Chapter 5—Section 3, retrieved at www.makelinux.net/ldd3/chp-5-sect-3, Mar. 2005.*
Alex C. Snoeren, "Lecture 6: Semaphores and Monitors", retrieved at cseweb.ucsd.edu/classes/fa05/cse120/lectures/120-I6.pdf, Feb 1, 2002.*
Unknown Author, "Java Programming Language Question", Mar. 31, 2009, www.experts-exchange.com/Programming/Languages/Java/Q_24279993.html.*
Brian Goetz, "Java Theory and Practice: Dealing with Interrupted Exception", www.ibm.com/developerworks/library/j-jtp05236/, May 23, 2006.*
Jakob Jenkov, "Read/Write Locks in Java", tutorials.jenkov.com/java-concurrency/read-write-locks.html, Jun. 9, 2008.*
Unknown Author, Imports Java Util in a VB Net Project, stackoverflow.com/questions/3611864/imports-java-util-zip-in-a-vb-net-project, Aug. 2010.*
European Search Report and Written Opinion dated May 14, 2013 for EP Patent Application No. 11193429.5.
Chapter 3: "Concurrent Processes" In: Brinch Hansen, Per: "Operating System Principles", 1973, Prentice-Hall, Inc., Englewood Clifs, New Jersey XP00269225, ISBN: 0-13-637843-9.

* cited by examiner

PROCESS-SAFE READ/WRITE LOCKS

BACKGROUND

Embodiments described herein relate generally to synchronization and use of shared resources within a computing environment, and more particularly to methods and apparatus for providing process-safe read/write locks on a shared resource to enable multiple-read, single-write functionality.

Known methods of preserving the data integrity of a shared resource within a computing environment employ a variety of constructs. For example, some approaches employ one or more mutual exclusion ("mutex") and/or semaphore programming constructs that together ensure that only a single process or thread may have write access to the shared resource at any given time. In such approaches, the semaphore typically maintains a count of the number of processes or threads currently reading or requesting to read from the shared resource, and the mutex allows a process or thread to write to the shared resource only when the count of reader processes or threads is zero. However, the count can be artificially high when a process that owns/has spawned a reader thread terminates ungraciously, as there is generally no mechanism for directing the semaphore to decrement the count when this occurs (since the process has terminated without warning). The artificially-high count thus causes a condition known as "starvation," wherein a process or thread waiting to write to the shared resource is never permitted to do so since the semaphore's reader count will never fall to zero. Some known methods of overcoming this condition require the closure of all processes and/or applications accessing the shared resource, and/or restarting of the operating system.

Thus, a need exists for a read/write lock mechanism that accurately tracks the number of reader process or threads seeking to access a shared resource and gracefully handles the unexpected termination of one or more processes.

SUMMARY

In one embodiment, a non-transitory processor-readable medium stores code representing instructions that when executed cause a processor to obtain a first mutual exclusion object. The first mutual exclusion object can be a write mutual exclusion object associated with a shared resource. The code can further represent instructions that when executed cause the processor to obtain a second mutual exclusion object associated with an object manager module and define a read event object with a name conforming to a predetermined format. The code can further represent instructions that when executed cause the processor to release the second mutual exclusion object, release the first mutual exclusion object, read at least a portion of the shared resource, obtain the second mutual exclusion object, destroy the read event object and release the second mutual exclusion object.

DETAILED DESCRIPTION

Figure 1:
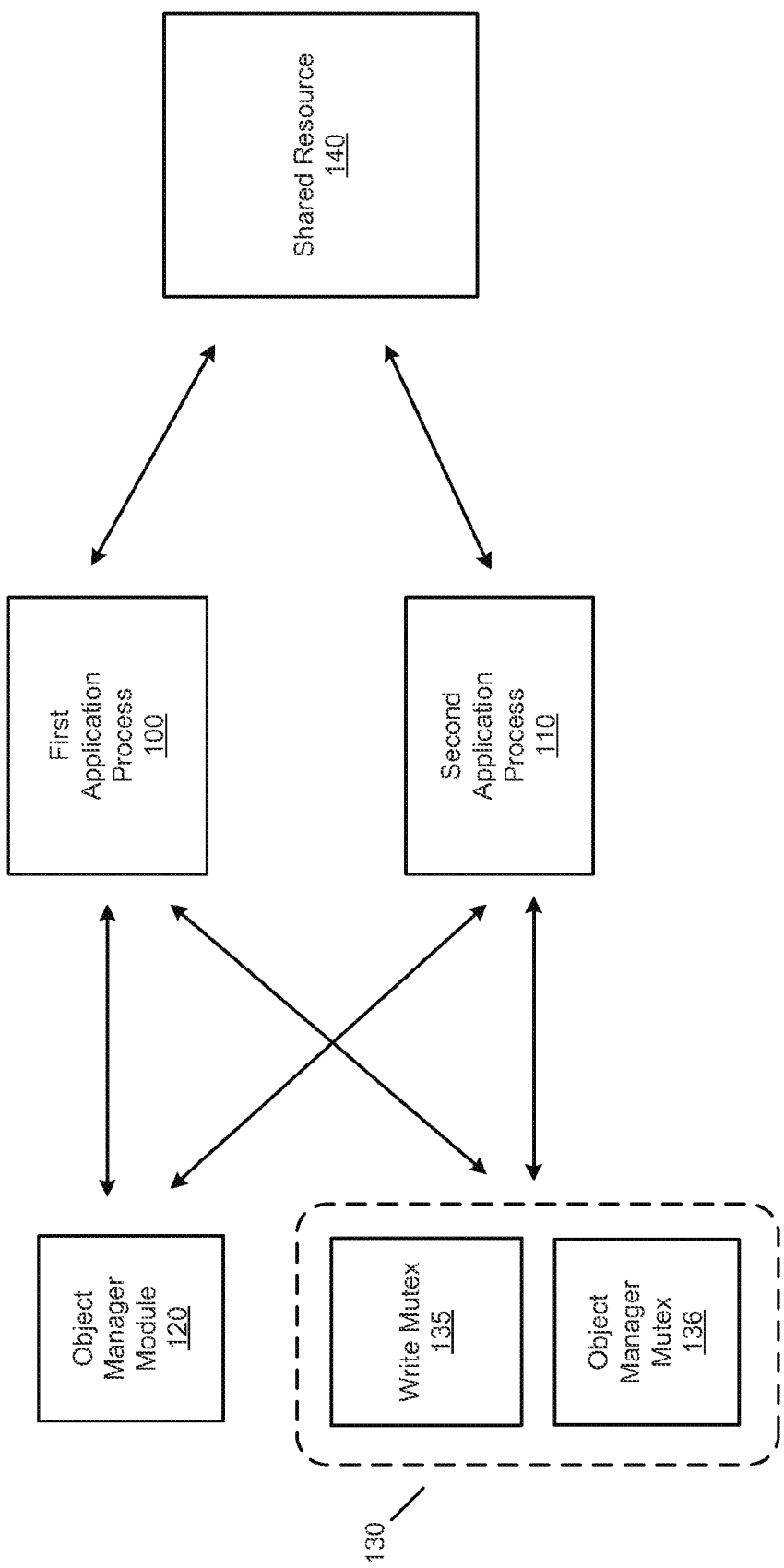
FIG. 1 is a schematic diagram illustrating a portion of a computing system that employs safe read/write locks, according to an embodiment.

In some embodiments, a first application process and a second application process are each in communication with a shared resource. Each of the first application process and the second application process can be, for example, a currently-executing application process of an application or program (executing in hardware) configured to provide at least one function to a user. Although not specified below, each step associated with the first application process and/or the second application process can optionally be performed by a thread of the first application process or the second application process, respectively. The shared resource can be, for example, a file (such as a registry file) or a database. The first application process and the second application process can each be in communication with a write mutual exclusion object (mutex), an object manager mutex and an object manager module. The write mutex can be an object configured to prevent more than a single application process or thread from accessing the shared resource at any given time. The object manager mutex can be an object configured to prevent more than a single application process or thread from accessing the object manager module at any given time.

The object manager module can be configured to define one or more read event objects, each read event object being associated with a process and/or thread currently attempting to read one or more bits from the shared resource. For example, the object manager module can define a first read event object associated with the first application process or a thread thereof, and a second read event object associated with the second application process or a thread thereof. In some embodiments, the object manager module can assign names to the first read event object and the second read event object based at least in part on a predefined naming convention. The predetermined naming convention can specify and/or allow that the name of each of the defined read event objects include a process ID of the application process with which that read event object is associated. The predetermined naming convention can further specify and/or allow that the name of each of the defined read event objects include a prefix and/or suffix of sufficient length and/or content to uniquely identify each of the read event objects as having been defined by the object manager module. In this manner, an accurate count of the number of existing read event objects defined by the object manager module and associated with the shared resource can be obtained based on the common prefix and/or suffix. In some embodiments, the object manager module can define the first read event object and/or second read event object in response to an instruction and/or command received from the first application process and the second application process, respectively.

To read from the shared resource, the first application process can first obtain both the write mutex associated with the shared resource and the object manager mutex associated with object manager module. The first application process can then instruct the object manager module to define a read event based on the process ID of the first application process. The first application process can next release both the object manager mutex and the write mutex. Having done so, the first application process can read one or more portions of the shared resource. Upon completion of the one or more reads, the first application process can obtain the object manager mutex a second time and instruct the object manager module to destroy the read event object associated with the first application process.

To write to the shared resource, the second application process can first obtain both the write mutex associated with the shared resource and the object manager mutex associated with the object manager module. The second application process can next request and receive a read event object count from the object manager module. The object manager module can calculate the read event object count based on, for example, a number of existing read event objects with names matching the predefined naming convention described above. Having received the read event object count, the object manager module can release the object manager mutex.

If the read event object count is zero, the second application process can determine that no other process and/or thread is currently reading the shared resource, and can proceed to write one or more bits to the shared resource. If the read event object count is not zero, however, the second application process can enter a quiescent state until it determines that no other process and/or thread is currently reading or seeking to read the shared resource. To determine whether any other process and/or thread is currently reading the shared resource, the second application process can check to determine whether the count of existing read event objects is zero, either periodically or in response to an indication that one or more processes or threads has ceased to read from the shared resource. Once the second application process has determined that the count of read event objects is zero, it can write to the shared resource and then release the write mutex.

As used in this specification, the singular forms "a," "an" and "the" include plural referents unless the context clearly dictates otherwise. Thus, for example, the term "a module" is intended to mean a single module or a combination of modules.

FIG. 1 is a schematic diagram that illustrates a first application process and a second application process, each in communication with a write mutex, an object manager mutex, an object manager module and a shared resource, according to an embodiment. More specifically, FIG. 1 illustrates a first application process 100 and a second application process 110, each in communication with an object manager module 120, a write mutex 135, an object manager mutex 136 and a shared resource 140. The write mutex 135 and the object manager mutex 136 are included in a lock module 130.

The first application process 100 and the second application process 110 can each be a process of any hardware-based application and/or software-based application (executing in hardware) configured to provide a set of functionality to a user. For example, either or both of the first application process 100 and the second application process 110 can be any valid device-based application process such as a word-processing, messaging, web browser, productivity, or game application process, or a process of another type or classification. Either or both of the first application process 100 and the second application process 110 can be a process of a text- and/or graphics-based application including, for example, a user interface, such as a shell or command-line interface and/or a graphical user interface (GUI). Either or both of the first application process 100 and the second application process 110 can be defined by and/or comprised of one or more coding instructions stored at a memory (not shown in FIG. 1). Either or both of the first application process 100 and the second application process 110 can be instantiations of an application stored as or organized into an executable file, such as a .bin, .exe or other executable program file. Although not discussed explicitly below, each step or action performed by the first application process 100 and/or the second application process 110 can be performed by a thread of the first application process 100 and/or a thread of the second application process 110, respectively.

The first application process 100 and the second application process 110 can include functionality that requires and/or includes access to the shared resource 140. Access to the shared resource 140 can include, for example, reading one or more bits from the shared resource 140 and/or writing one or more bits to the shared resource 140. In some embodiments, the first application process 100 and/or the second application process 110 can receive a user command and/or signal instructing the first application process 100 and/or the second application process 110 to read bits from and/or write bits to the shared resource 140.

The object manager module 120 can be any hardware-based module and/or software-based module configured to manage one or more processes and resources of a computing environment. For example, the object manager module 120 can be a Windows Object Manager and/or Windows Kernel Object Manager, such as those affiliated with the Windows NT family of operating systems. In some embodiments, the object manager module 120 can be configured to define and/or destroy one or more read event objects associated with one or more applications, processes and/or threads currently reading or requesting to read the shared resource 140.

The lock module 130 can be a hardware-based and/or software-based module configured to provide single process or single-thread access to a shared resource. In some embodiments, the lock module 130 can include one or more submodules that provide process-safe read-lock and write-lock protection for the shared resource 140. As shown in FIG. 1, the lock module 130 includes the write mutex 135 and the object manager mutex 136. Although not shown in FIG. 1, in some embodiments the lock module 130 can include a reader activity event object associated with the shared resource 140. The reader activity event object can, for example, send one or more indications or notifications when any process or thread has ceased to read from the shared resource 140.

The write mutex 135 can be any combination of hardware and/or software configured to allow only a single program, application, process and/or thread to access the shared resource 140 at any given time. In some embodiments, the write mutex 135 can be a mutual exclusion object configured to grant write access to the shared resource 140 to only a single process or thread at any given time. In some embodiments, the write mutex 135 can be a Microsoft Windows object configured to be owned and/or associated with only a single process or thread at any given time, the single process or thread alone being permitted to write to the shared resource 140 during that time.

The object manager mutex 136 can be any combination of hardware and/or software configured to allow only a single program, application, process and/or thread to access the object manager module 120 at any given time. More specifically, the object manager mutex 136 can be a construct and/or object configured to allow only a single program process or thread to access and/or initialize a given function or method of the object manager module 120 at any given time. For example, the object manager mutex 136 can restrict the first application process 100 from initiating a read event object create function, a read event object count function, or other function of the object manager module 120 when the object manager mutex 136 is owned by, for example, the second application process 110. In some embodiments, the object manager mutex 136 can be a Microsoft Windows object configured to be owned and/or associated with only a single process or thread at any given time, the single process or thread being alone permitted to initialize and/or trigger a function or method of the object manager module 120 during that time.

The shared resource 140 can be any shared resource accessible by the first application process 100 and/or the second application process 110, such as a data file, data object, database table, database record, or other resource. For example, the shared resource 140 can be a data file stored at a memory (not shown in FIG. 1), a relational database and/or relational database table stored locally at a single device and/or accessible via a local area network (LAN), a wide area network (WAN) and/or the Internet.

As shown in FIG. 1, the first application process 100 and the second application process 110 can each be in communication with any of the object manager module 120, the lock module 130 (including the write mutex 135 and the object manager mutex 136) and the shared resource 140. Although not shown in FIG. 1, each of the write mutex 135 and the object manager mutex 136 can be owned by the first application process 100 and/or the second application process 110 at distinct moments in time. Each of the object manager module 120, the write mutex 135, the object manager mutex 136 and shared resource 140 can be in communication with either or both of the first application process 100 and the second application process 110.

Figure 2:
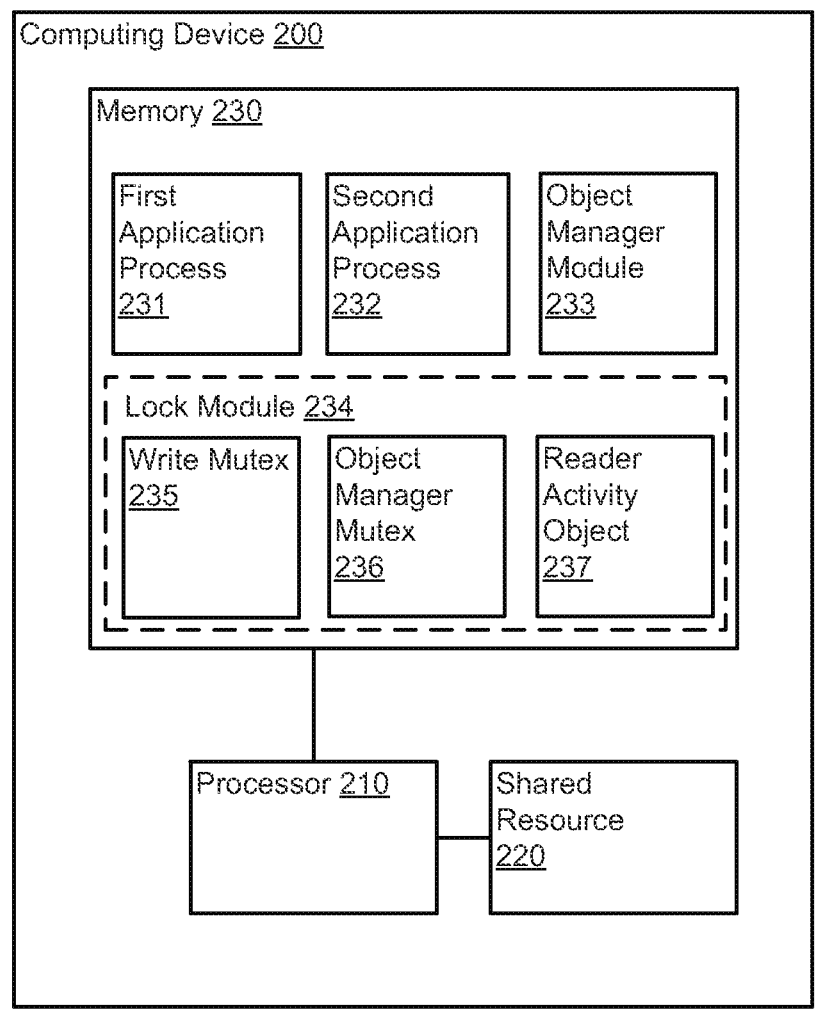
FIG. 2 is a schematic illustration of a computing device employing safe read/write locks, according to another embodiment.

FIG. 2 is a schematic illustration of a computing device that employs process-safe read/write locks, according to an embodiment. More specifically, FIG. 2 is a system block diagram of a computing device 200 that includes a processor 210, a shared resource 220 and a memory 230. The memory 230 includes code configured to cause a processor, such as processor 210, to execute a first application process 231, a second application process 232, an object manager module 233 and a lock module 234. The lock module 234 includes a write mutex 235, an object manager mutex 236 and a reader activity object 237.

The computing device 200 can be a desktop, server, mainframe or mobile computing device capable of executing an embedded and/or non-embedded operating system. For example, the computing device 200 can be a desktop personal computer, a network, web, or other server device, a personal digital assistant (PDA), a cellular telephone, a smartphone, a tablet computing device, etc. The computing device 200 can be configured to execute, for example, an operating system including multi-tasking and/or multi-threading functionality.

The processor 210 can be any known type of microprocessor or microcontroller capable of executing instructions stored at the memory 230. For example, the processor 210 can be a microprocessor designed for use within a desktop or laptop computer, a Reduced Instruction Set Computer (RISC) processor, or other known type of processor. The instructions can be associated with the first application process 231, the second application process 232, the object manager module 233, the lock module 234, the write mutex 235, the object manager mutex 236, and/or the read activity object 237.

The shared resource 220 can be substantially similar to the shared resource 140 discussed in connection with FIG. 1 above. Namely, the shared resource 220 can be a file, driver, archive, database field, row, or table, or other configurable and/or storable data. The shared resource 220 can be, for example, a computer file capable of being accessed by (i.e., read from and/or written to) the first application process 231 and/or the second application process 232. The shared resource 220 can optionally be accessed by more than two computing applications, processes, threads and/or objects. Although not shown in FIG. 2, in some embodiments, the shared resource 220 can alternatively be operatively coupled to the computing device 200 via a network, such as a local area network (LAN), wide area network (WAN) or the Internet.

The memory 230 can be a known computer memory, such as Random Access Memory (RAM), Read-only Memory (ROM), flash memory, a hard disk drive, etc. As shown in FIG. 2, the memory 230 stores code configured to cause a processor, such as the processor 220, to execute each of the first application process 231, the second application process 232, the object manager module 233, the lock module 234, the write mutex 235, the object manager mutex 236 and the reader activity object 237.

The first application process 231 and the second application process 232 can each be a distinct process of the same or different computing applications. For example, the first application process 231 could be a process of a word-processing application, and the second application process 232 could be a process of a web browser application. Alternatively, the first application process 231 and the second application process 232 can be distinct processes of the same application. The object manager module 233 can be configured to manage and control access to one or more system resources, such as physical devices, files, folders, registry entries, running processes and the like (e.g., the object manager module 120 of FIG. 1).

As shown in FIG. 2, the lock module 234 includes the write mutex 235, the object manager mutex 236 and the read activity object 237. The lock module 234 can be, for example, a dynamic link library (DLL) for use by one or more running processes and/or threads. Thus, the lock module 234 can be instantiated, included in and/or accessed by a running process and/or thread. In some embodiments, the lock module 234 can also include one or more submodules configured to enable a thread of the first application process 231 and/or a thread of the second application process 232 to access the shared resource 220.

The write mutex 235 can be a mutual exclusion object configured to allow only a single thread or process (such as only one of the first application process 231 and the second application process 232) to write to the shared resource 220 at any given time. The object manager mutex 236 can be a mutual exclusion object configured to allow only a single thread or process (such as only one of the first application process 231 and the second application process 232) to access the object manager module 233 at any given time. Each of the write mutex 235 and the object manager mutex 236 can be substantially similar to their counterparts (i.e., the write mutex 135 and the object manager mutex 136) discussed in connection with FIG. 1 above.

Each of the write mutex 235, the object manager mutex 236 and the reader activity object 237 can be assigned a name by the lock module 234. In some embodiments, each of the names can be assigned according to a predetermined naming convention. For example, the lock module 234 could assign, to the write mutex 235, a name including the string "WRITE_MUTEX<Lock Name>" (where "<Lock Name>" is a unique identifier associated with the write mutex 235 and/or the shared resource 220). In this example, the lock module 234 could assign, to the object manager mutex 236, a name including the string "OBJECT_MANAGER_MUTEX<Lock Name>". In the example, the lock module 234 can assign, to the reader activity object 237, a name including the string "READER_EVENT<Lock Name>". In some embodiments, each of the names described above can include a common prepended and or appended string sufficient to distinguish each of the write mutex 235, the object manager mutex 236 and the read activity object 237 from other such constructs associated with one or more other threads, processes and/or shared resources included in the computing device 200.

Figure 3:
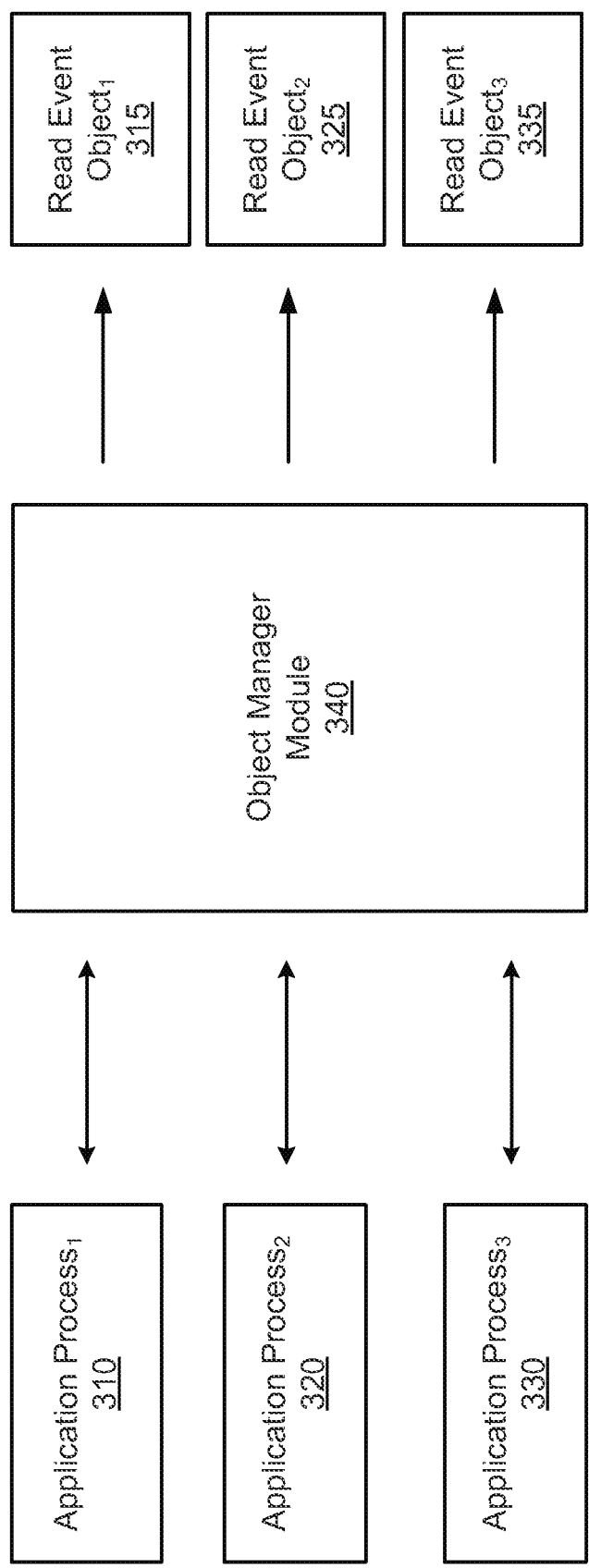
FIG. 3 is a schematic block diagram that illustrates an object manager module that generates multiple read event objects each associated with an application process, according to another embodiment.

FIG. 3 is a schematic block diagram that illustrates an object manager module that generates multiple read event objects each associated with an application process, according to another embodiment. More specifically, FIG. 3 illustrates an object manager module 340 in communication with application process$_1$ 310, application process$_2$ 320 and application process$_3$ 330. The object manager module 340 is also in communication with a read event object$_1$ 315, a read event object$_2$ 325 and a read event object$_3$ 335.

The object manager module 340 can be a hardware-based and/or software-based module configured to manage and control access to one or more system resources, such as physical devices, files, folders, registry entries, running processes and the like. In some embodiments, the object manager module 340 can be configured to manage one or more processes and resources of a computing environment. For example, the object manager module 340 can be a Windows Object Manager and/or Windows Kernel Object Manager, such as those affiliated with the Windows NT family of operating systems. In some embodiments, the object manager module 340 can be configured to define, count and/or destroy one or more read event objects associated with one or more applications, processes and/or threads currently reading or requesting to read a shared resource (not shown in FIG. 3).

Each of the application process$_1$ 310, the application process$_2$ 320 and the application process$_3$ 330 can be, for example, a word-processing, e-mail, web browser, graphics, productivity, or game application process, or a process of another type or classification. Each of the application process$_1$ 310, the application process$_2$ 320 and the application process$_3$ 330 can be defined by and/or comprised of one or more coding instructions stored at a memory (not shown in FIG. 3). As described in connection with the first application process 100 and the second application process of FIG. 1 above, each of the application process$_1$ 310, the application process$_2$ 320 and the application process$_3$ 330 can include one or more threads executing concurrently and/or asynchronously.

Each of the read event object$_1$ 315, the read event object$_2$ 325 and the read event object$_3$ 335 can be a read event object associated with a thread of one of the application process$_1$ 310, the application process$_2$ 320 and the application process$_3$ 330. More specifically, each of the read event objects listed above can be associated with a single thread of a single application process, the existence of each read event object signifying that a thread of the application process with which it is associated is currently attempting to read from the shared resource. In some embodiments, each of the read event object$_1$ 315, the read event object$_2$ 325 and the read event object$_3$ 335 can have a name and/or identifier defined according to a predetermined naming convention. The predetermined naming convention can ensure and/or allow, for example, that a name of each read event object include a process ID of the application process with which it is associated and a thread ID of the thread of the application process with which it is associated. The predetermined naming convention can further ensure and/or allow that the name of each read event object include a unique identifier associated with the shared resource attempting to be read by the thread of the application process with which that read event object is associated.

The object manager module 340 can be further configured to define, for each of the application process$_1$ 310, the application process$_2$ 320 and the application process$_3$ 330, a read event object associated with a thread of that application process. For example, the object manager module 340 could define the read event object$_1$ 315, the read event object$_2$ 325 and the read event object$_3$ 335, the read event object$_1$ 315 being associated with the application process$_1$ 310, the read event object$_2$ 325 being associated with the application process$_2$ 320 and the read event object$_3$ 335 being associated with the application process$_3$ 330.

As described above, the object manager module 340 can define the read event object$_1$ 315 when the application process$_1$ 310 requests read access to the shared resource. Accordingly, the object manager module 340 can define the read event object$_2$ 325 and the read event object$_3$ 335 when the application process$_2$ 320 and the application process$_3$ 330, respectively, request read access to the shared resource. By so doing, the object manager module 340 can provide an indication, independent of the presence of each application process itself, that that application process (or a thread thereof) is currently reading or requesting read access to the shared resource. In this manner, the object manager module 340 can ensure that the indication of the requested read access for a given application process (i.e., the existence of the read event object itself) will co-exist with the application process, as the unexpected termination of an application process will also result in the termination of the read event object with which that application process is associated. Thus, the object manager module 340 can likewise ensure that the total number of existing read event objects is representative of the total number of application processes and/or threads currently attempting to read from the shared resource.

Figure 4:
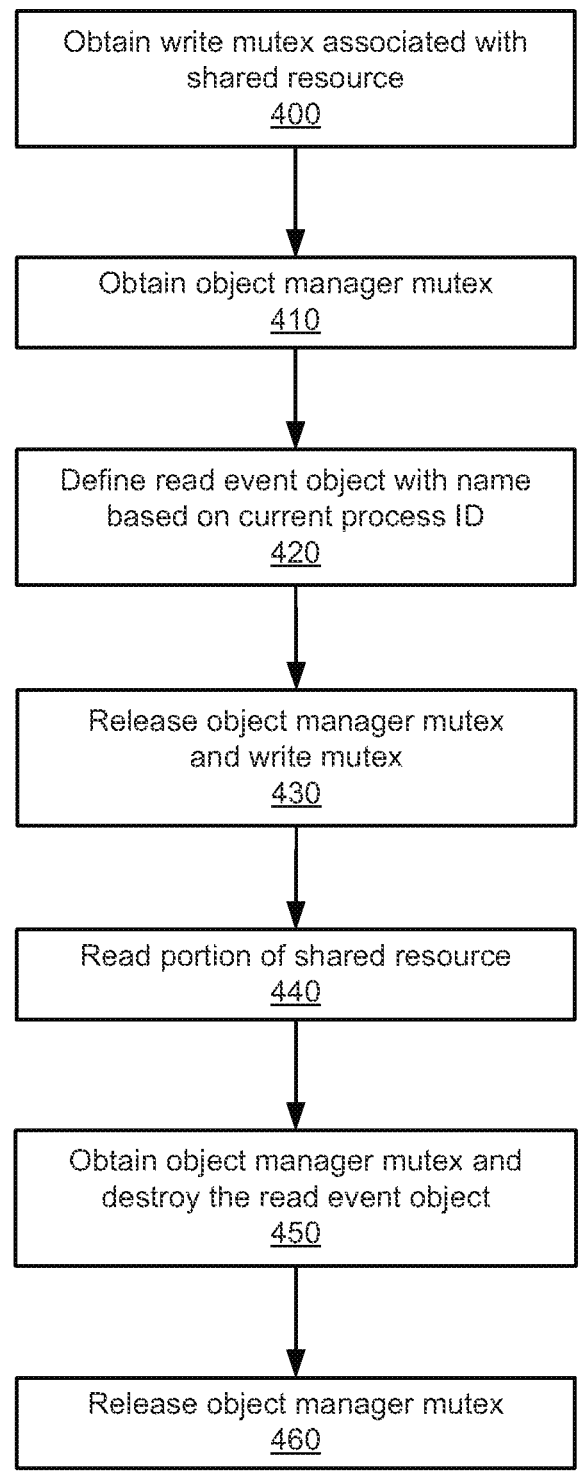
FIG. 4 is a flow chart that illustrates a method of reading from a shared resource in a manner that preserves data integrity, according to another embodiment.

FIG. 4 is a flow chart that illustrates a method of reading from a shared resource in a manner that preserves data integrity and avoids race conditions, according to another embodiment. More specifically, FIG. 4 illustrates a method of reading from a shared resource using a process-safe read lock, the reading being performed by a thread of a running process.

As shown in FIG. 4, a thread can obtain a write mutex associated with a shared resource, 400. The thread can be, for example, a thread of a currently-executing process. The currently-executing process can be, for example, an application process of a word processor, web browser, graphics, or other software-based and/or hardware-based application currently executing on, at or by an operating system. The operating system, the currently-executing process and/or the thread (executing within the currently-executing process) can each be executed at a processor of a computing device (e.g., the computing device 200 discussed in connection with FIG. 2 above). Code configured to cause the processor to execute the operating system, the currently-executing process and/or the thread can be stored at a memory. The memory can be physically and/or operatively coupled to the processor (e.g., the processor 210 coupled to the memory 230 of FIG. 2). The write mutex can be a mutual exclusion object associated with a shared resource, such as an object configured to allow only a single thread or process to access the shared resource at a given time. The shared resource can be substantially similar to the shared resource 140 discussed in connection with FIG. 1 above.

The thread can perform a wait routine and/or otherwise enter a quiescent state while awaiting access to the write mutex. In some embodiments, the thread can enter a module configured to direct the thread to 1) wait while the write mutex is occupied (i.e., "owned") by another thread or process, and 2) obtain the write mutex once the write mutex is no longer owned by any other thread or process. This module can optionally be referred to as a "WaitForRead" module. The WaitForRead module can be a method, function, subroutine and/or other module type.

The thread can next obtain an object manager mutex, 410. More specifically, the thread can obtain exclusive access to (i.e., "ownership of") an object manager mutual exclusion object associated with an object manager module and/or process. The object manager module can be, for example, a module configured to manage and control access to one or more system resources, such as physical devices, files, folders, registry entries, running processes and the like. The object manager mutex can be a mutual exclusion object configured to allow only a single process or thread to access to the various submodules, functions and/or methods of the object manager module at a given time.

To obtain the object manager mutex, the thread can perform a wait routine and/or otherwise enter a quiescent state while awaiting access to the object manager mutex. In some embodiments, this step can be performed within the WaitForRead module described above. Once no other thread or process is currently accessing and/or has ownership of the object manager module, the thread can obtain the object manager mutex and thus exclusive access to the submodules, functions and/or methods of the object manager module.

Having obtained the object manager mutex, the thread can instruct the object manager module to define a read event object with a specified name, 420. More specifically, the thread can instruct the object manager module to define a read event object according to a predetermined naming convention, thereby ensuring that the read event object is uniquely identifiable. In some embodiments, the thread can instruct the object manager module by invoking one or more submodules, methods, functions and/or subroutines of the object manager module. The one or more methods, functions and/or subroutines can be predefined, and configured to create a new object, such as the read event object.

In some embodiments, the predetermined naming convention can stipulate or allow that the created read event object have a name including the string "_READ_<Lock Name>_", where "<Lock Name>" is an identifier associated with the shared resource. The name of the read event object can further include a string portion representing a process ID of the currently-executing process described above, and a thread ID of the thread. In this manner, the read event object can be uniquely identified, and can be included in a count of read event objects associated with the shared resource.

Having defined the read event object associated with the thread and the shared resource, the thread can release the object manager mutex and the write mutex, 430. More specifically, the thread can send one or more signals configured to release and/or disassociate the object manager mutex from the thread, thus allowing the object manager mutex to be obtained by another thread of the same or another process. The thread can next release and/or disassociate the write mutex from the thread, thus allowing the write mutex to be obtained by another thread of the same or another process. In this manner, another thread can obtain the write mutex and thus write access to the shared resource. In some embodiments, the thread can release the write mutex by calling, invoking and/or referencing a module or submodule configured to release the write mutex. The module can optionally be referred to as a "ReleaseWrite" module, and can be a method, function or subroutine.

The thread can next read an indicated portion of the shared resource, 440. In doing so, the thread can optionally perform one or more read actions sufficient to determine the content of one or more portions of the shared resource. For example, when the shared resource is a database or database table, the thread can perform one or more database queries, such as Structured Query Language (SQL) queries, sufficient to retrieve one or more records and/or field values stored in the database.

Having read the indicated portion from the shared resource, the thread can obtain the object manager mutex and destroy the read event object, 450. To obtain the object manager mutex, the thread can perform essentially the same actions as discussed in connection with step 410 above. The thread can then optionally invoke a module configured to destroy the read event object for the thread (as defined in step 420 above). The module configured to destroy the read event object for the thread can be a method, subroutine, or function, and can optionally be referred to as a "ReleaseRead" module.

Having completed its use of the shared resource, the thread can release the object manager mutex, 460. After releasing the object manager mutex, the thread can continue operation. In some embodiments, the thread can use one or more bits read from the shared resource to, for example, calculate a value, output the one or more bits to a display, etc.

Figure 5:
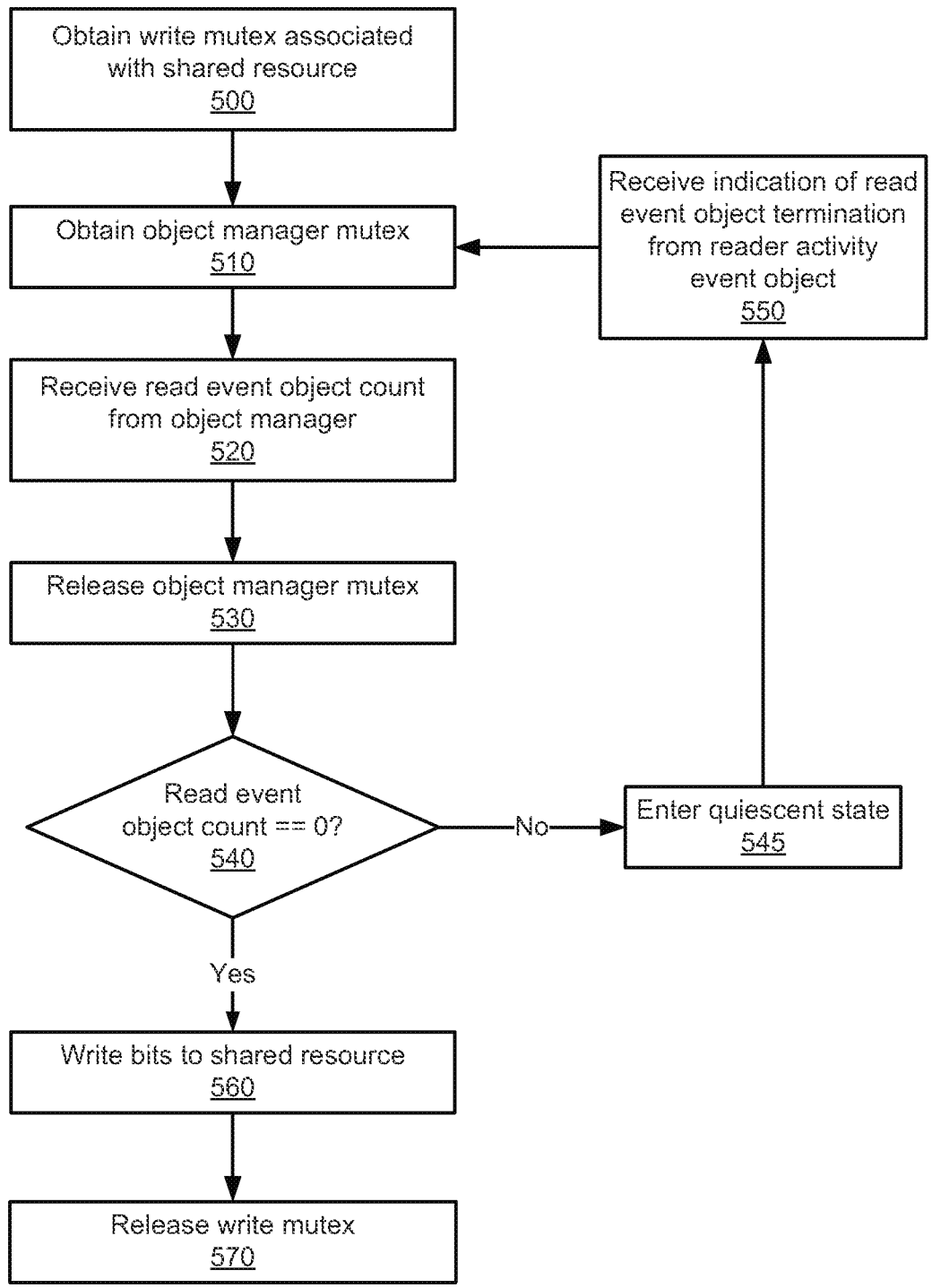
FIG. 5 is a flow chart that illustrates a method of writing to a shared resource in a manner that preserves data integrity, according to another embodiment.

FIG. 5 is a flow chart that illustrates a method of writing to a shared resource in a manner that preserves data integrity, according to another embodiment. More specifically, FIG. 5 illustrates a method of writing to a shared resource via a process-safe read lock, the writing being performed by a thread of a running process.

As shown in FIG. 5, a thread can obtain a write mutex associated with a shared resource, 500. The thread can be, for example, a thread of a currently-executing process. The currently-executing process can be, for example, an application process of a word processor, web browser, graphics, or other software- and/or hardware-based application currently executing on, at or by an operating system. The operating system, the currently-executing process and/or the thread (executing within the currently-executing process) can each be executed at a processor of a computing device (e.g., the computing device 200 discussed in connection with FIG. 2 above). Code configured to cause the processor to execute the operating system, the currently-executing process and/or the thread can be stored at a memory. The memory can be physically and/or operatively coupled to the processor (e.g., the processor 210 coupled to the memory 230 of FIG. 2). The write mutex can be a mutual exclusion object associated with a shared resource, such as an object configured to allow only a single thread or process to access the shared resource at a given time. The shared resource can be substantially similar to the shared resource 140 discussed in connection with FIG. 1 above.

The thread can perform a wait routine and/or otherwise enter a quiescent state while awaiting access to the write mutex. In some embodiments, the thread can enter a module configured to direct the thread to 1) wait while the write mutex is occupied (i.e., "owned") by another thread or process, and 2) obtain the write mutex once the write mutex is no longer owned by any other thread or process. In some embodiments, the module can be a method, function, subroutine and/or other module. The module can optionally be referred to as a "WaitForRead" module.

The thread can next obtain an object manager mutex, 510. More specifically, the thread can obtain exclusive access to (i.e., "ownership of") an object manager mutual exclusion object associated with an object manager module and/or process. The object manager module can be, for example, a module configured to manage and control access to one or more system resources, such as physical devices, files, folders, registry entries, running processes and the like. The object manager mutex can be a mutual exclusion object configured to allow only a single process or thread to access to the various submodules, functions and/or methods of the object manager module at a given time.

To obtain the object manager mutex, the thread can perform a wait routine and/or otherwise enter a quiescent state while awaiting access to the object manager mutex. In some embodiments, this step can be performed within the WaitForRead module described above. Once no other thread or process is currently accessing and/or has ownership of the object manager module, the thread can obtain the object manager mutex and thus exclusive access to the submodules, methods and/or functions of the object manager module.

Having obtained both the write mutex and the object manager mutex, the thread can receive a read event object count from the object manager module, 520. To do so, the thread can call, invoke and/or reference a submodule of the object manager module, the submodule configured to return a quantity or count of existing reader event objects with names matching a predetermined format. In this manner, the thread can determine whether any other threads are currently reading the shared resource. The predetermined format can be, for example, a naming format or naming convention that includes at least one of a process ID, a thread ID and a lock ID. In some embodiments, the predetermined format can include one or more characters that distinguish all read event objects associated with the shared resource from other read event objects currently present at or in the operating system. Having received the current read event object count from the object manager module, the thread can release the object manager mutex, 530.

The thread can next determine whether the received read event object count is zero, 540. To do so, the thread can compare the count value received from the object manager module with the number zero. If the read event object count does in fact equal zero, the thread can proceed to write one or more bits to the shared resource, 560. If the read event object count does not equal zero, the thread can enter a quiescent state, 545. In other words, the thread can perform a "wait" operation configured to perform no substantial action until either: a) the passage of a predetermined period of time or b) the detection of a read event object termination.

The thread can receive an indication of read event object termination from a reader activity event object, 550. For example, the thread can receive a notification from the reader activity event object indicating that one or more read event objects has terminated, and thus that one or more associated processes and/or threads has ceased to perform a read operation on the shared resource. Because the termination of a read event can indicate that the shared resource is potentially no longer locked by any reader process or thread, the thread can accordingly return to step 510 to obtain the object manager mutex, receive an updated read event object count from the object manager module (at step 520), release the object manager mutex (at step 530), and compare the updated read event object count to zero (at step 540). The thread can perform this sequence of steps (i.e., the steps 540, 545, 550, 510, 520, 530 and 540) until the most-recently received read event object count equals zero. Said differently, having obtained the write mutex, the thread can wait to access the shared resource until no reader processes or threads are currently accessing the shared resource. To do so, the thread can optionally continue to periodically check, at a given time interval, for the existence of any reader processes or threads currently accessing the shared resource. Alternatively or additionally, the thread can enter a quiescent state and await notification from the reader activity event object that one or more reader processes has terminated before repeating the sequence of steps 510, 520, 530 and 540 described above.

Having determined that the most-recently received object count equals zero, the thread can write one or more bits to the shared resource, 560. The thread can optionally perform one or more write operations on the shared resource, including one or more portions of information. Having completed the one or more write operations, the thread can release the write mutex, 570. In some embodiments, the thread can do so via a module configured to release the write mutex. This module can optionally be referred to as a "ReleaseWrite" module, method, subroutine and/or function.

Some embodiments described herein relate to a computer storage product with a non-transitory computer-readable medium (also can be referred to as a non-transitory processor-readable medium) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) may be those designed and constructed for the specific purpose or purposes. Examples of non-transitory computer-readable media include, but are not limited to: magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM) and Random-Access Memory (RAM) devices.

Examples of computer code include, but are not limited to, micro-code or micro-instructions, machine instructions, such as produced by a compiler, code used to produce a web service, and files containing higher-level instructions that are executed by a computer using an interpreter. For example, embodiments may be implemented using Java, C++, or other programming languages (e.g., object-oriented programming languages) and development tools. Additional examples of computer code include, but are not limited to, control signals, encrypted code, and compressed code.

While various embodiments have been described above, it should be understood that they have been presented by way of example only, not limitation, and various changes in form and details may be made. Any portion of the apparatus and/or methods described herein may be combined in any combination, except mutually exclusive combinations. The embodiments described herein can include various combinations and/or sub-combinations of the functions, components and/or features of the different embodiments described. For example, in some embodiments a non-transitory processor-readable medium can store code configured to read one or more bits from a first shared resource and write one or more bits to a second shared resource, distinct from the first shared resource.

What is claimed is:

1. A non-transitory processor-readable medium storing code representing instructions to cause a processor to:
   obtain exclusive access to a first mutual exclusion object, the first mutual exclusion object associated with a shared resource;
   obtain, at a first time, exclusive access to a second mutual exclusion object, the second mutual exclusion object associated with an object manager module configured to instantiate a read event object in response to obtaining exclusive access to the second mutual exclusion object, the object manager module configured to add the read event object to a set of read event objects associated with the shared resource;
   release the first mutual exclusion object and the second mutual exclusion object after the read event object has been instantiated;
   obtain, at a second time, exclusive access to the first mutual exclusion object and the second mutual exclusion object;
   receive, from the object manager module and after obtaining exclusive access to the second mutual exclusion object at the second time, a count value calculated, by the object manager module, based on a number of read event objects in the set of read event objects;
   release the second mutual exclusion object;
   write one or more bits to the shared resource when the count value satisfies a criterion; and
   release the first mutual exclusion object in response to writing the one or more bits to the shared resource.

2. The non-transitory processor-readable medium of claim 1, wherein each read event object from the set of read event objects is a kernel object and has a name conforming to a predetermined format.

3. The non-transitory processor-readable medium of claim 1, the code further comprising code representing instructions to cause the processor to:
   determine, in response to receiving the count value at the second time, that the count value at the second time does not satisfy the criterion;
   receive, from the object manager module, the count value at a third time after the second time; and
   determine that the count value at the third time satisfies the criterion, the code to cause the processor to write includes code to cause the processor to write the one or more bits to the shared resource.

4. The non-transitory processor-readable medium of claim 1, further comprising code representing instructions to cause the processor to:
   remain in an idle state when the count value does not satisfy the criterion.

5. The non-transitory processor-readable medium of claim 1, wherein the shared resource is at least one of a data file, a buffer or a database record.

6. The non-transitory processor-readable medium of claim 1, wherein the count value satisfies the criterion based at least in part on an unexpected reader process termination.

7. The non-transitory processor-readable medium of claim 1, wherein the count value satisfies the criterion when the count value equals zero.

8. An apparatus, comprising:
   an object manager module implemented in at least one of a memory or a processing device, the object manager module configured to instantiate at least one read event object in response to receiving a read request for a shared resource from at least one application process, the object manager module configured to calculate a count value based at least in part on a number of instantiated read event objects; and
   a lock module configured to provide an application module exclusive access to a write mutual exclusion object associated with the shared resource in response to receiving a request for exclusive access to the shared resource from the application module, the lock module configured to provide the application module exclusive access to an object manager mutual exclusion object associated with the object manager module in response to receiving a request for exclusive access to the object manager module from the application module,
   the object manager module configured to send, to the application module and based on the application module having exclusive access to the object manager mutual exclusion object at a time, the count value such that the application module writes one or more bits to the shared resource when the count value satisfies a criterion,
   the lock module configured to release exclusive access of the application module to the object manager mutual exclusion object in response to receiving an indication that the application module received the count value, the lock module configured to release exclusive access of the application module to the write mutual exclusion object in response to receiving an indication that the application module has written the one or more bits to the shared resource.

9. The apparatus of claim 8, wherein each read event object from the set of read event objects is a kernel object and has a name conforming to a predetermined format.

10. The apparatus of claim 8, wherein the lock module is a dynamic link library (DLL).

11. The apparatus of claim 8, wherein the shared resource is at least one of a data file, a buffer or a database record.

12. The apparatus of claim 8, wherein the object manager module is configured to send the count value such that the application module remains in an idle state when the count value does not satisfy the criterion.

13. The apparatus of claim 8, wherein the count value satisfies the criterion when the number of read event objects in the set of read event objects equals zero.

14. The apparatus of claim 8, wherein:
   the object manager module is configured to determine a read access status of an application process from the at least one application process, and
   the object manager module is configured to destroy at least one read event object associated with the application process if the read access status indicates the application process has unexpectedly terminated.

15. The non-transitory processor-readable medium of claim 1, wherein obtaining exclusive access to the second mutual exclusion object includes obtaining exclusive access to the object manager module.

\* \* \* \* \*